(12) United States Patent
Milanowski

(10) Patent No.: US 10,060,136 B2
(45) Date of Patent: Aug. 28, 2018

(54) BALUSTER CONNECTOR

(71) Applicant: Universal Consumer Products, Inc., Grand Rapids, MI (US)

(72) Inventor: Daniel J. Milanowski, Grand Rapids, MI (US)

(73) Assignee: Universal Consumer Products, Inc., Grand Rapids, MI (US)

(*) Notice: Subject to any disclaimer, the term of this patent is extended or adjusted under 35 U.S.C. 154(b) by 188 days.

(21) Appl. No.: 14/959,078

(22) Filed: Dec. 4, 2015

(65) Prior Publication Data

US 2016/0160900 A1 Jun. 9, 2016

Related U.S. Application Data

(60) Provisional application No. 62/089,568, filed on Dec. 9, 2014.

(51) Int. Cl.
| | |
|---|---|
| *E04F 11/18* | (2006.01) |
| *E04H 17/14* | (2006.01) |
| *F16B 37/08* | (2006.01) |
| *F16B 13/12* | (2006.01) |
| *F16B 7/04* | (2006.01) |

(52) U.S. Cl.
CPC ...... *E04F 11/1842* (2013.01); *E04F 11/1817* (2013.01); *E04F 2011/1821* (2013.01); *E04H 17/1426* (2013.01); *F16B 7/0473* (2013.01); *F16B 13/12* (2013.01); *F16B 13/128* (2013.01); *F16B 37/0821* (2013.01)

(58) Field of Classification Search
CPC ...... F16B 13/12; F16B 13/124; F16B 13/063; F16B 37/0821; E04H 17/1439; E04H 17/1426; E04F 11/1817; E04F 2011/1819; E04F 2011/2021

USPC ........ 411/80.1, 80.5, 55; 256/22, 65.01, 66, 256/68–70

See application file for complete search history.

(56) References Cited

U.S. PATENT DOCUMENTS

| | | | | |
|---|---|---|---|---|
| 1,066,040 | A * | 7/1913 | Osborne | F16B 13/124 411/68 |
| 2,984,698 | A * | 5/1961 | Strauss | H01L 317/58 174/138 R |
| 3,608,938 | A * | 9/1971 | Murdock | F16L 33/00 29/453 |
| 3,955,800 | A * | 5/1976 | Russo | E04F 11/181 256/59 |
| 4,083,641 | A * | 4/1978 | Sado | E04F 11/181 403/258 |

(Continued)

FOREIGN PATENT DOCUMENTS

DE 19525334 A1 7/1996

*Primary Examiner* — Flemming Saether
(74) *Attorney, Agent, or Firm* — McGarry Bair PC

(57) ABSTRACT

A connector is disclosed for interconnecting a baluster having a recess on at least one end thereof to a railing component. The connector has a first body portion having an outer surface and an interface surface with a mounting groove thereon. The connector also has a second body portion having an outer surface and an interface surface with a mounting groove thereon. The interface surface of the second body portion having a mating portion adapted to receive a portion of the interface surface on the first body portion, and a hinge connecting the first body portion to the second body portion.

22 Claims, 14 Drawing Sheets

(56) References Cited

U.S. PATENT DOCUMENTS

| | | | | |
|---|---|---|---|---|
| 4,235,150 A * | 11/1980 | Nony | ............ | F16B 13/12 |
| | | | | 411/71 |
| 4,657,458 A * | 4/1987 | Wollar | ............ | F16B 37/043 |
| | | | | 411/182 |
| 4,729,704 A * | 3/1988 | Yokoyama | ............ | F16B 37/043 |
| | | | | 411/182 |
| 5,437,433 A | 8/1995 | Rezek | | |
| 5,791,845 A * | 8/1998 | Fulop | ............ | F16B 13/124 |
| | | | | 411/182 |
| 5,938,385 A * | 8/1999 | Garfield | ............ | F16B 13/124 |
| | | | | 411/60.2 |
| 6,835,038 B2 * | 12/2004 | Benito-Navazo | ..... | F16B 13/061 |
| | | | | 411/372.5 |
| 7,762,533 B2 * | 7/2010 | DeRogatis | ............ | E04F 11/181 |
| | | | | 256/22 |
| 8,033,530 B2 * | 10/2011 | Timothy | ............ | E04F 11/181 |
| | | | | 256/22 |
| 2009/0200532 A1 | 8/2009 | Platt | | |
| 2011/0248232 A1 * | 10/2011 | Leary | ............ | E04F 11/1817 |
| | | | | 256/65.01 |

* cited by examiner

BALUSTER CONNECTOR

CROSS-REFERENCE TO RELATED APPLICATIONS

This application claims the benefit of U.S. Provisional Patent Application No. 62/089,568, filed Dec. 9, 2014, which is incorporated herein by reference in its entirety.

BACKGROUND OF THE INVENTION

Railings are ubiquitous in commercial and residential building projects which include at least one railing and several balusters extending therebetween. A railing can be disposed horizontally or angularly, depending on whether the railing is located adjacent to a floor surface, a ramp or a stairway. Conventional balusters are attached to a railing by a bracket or a connector by threaded fasteners, or by extruding a connectable section into the center of the hollow baluster, such as a screw boss supported within a hollow baluster by connecting struts.

The typical baluster connector does not always satisfy the consumer's desire for a connection that is difficult to disconnect. The extruded boss-type connection results in a secure connection but can also cause wasted material in the center of the baluster since the baluster is typically connected at each end to the railing.

SUMMARY OF THE INVENTION

In one aspect of the invention, the invention relates to a connector for interconnecting a baluster having a recess on at least one end thereof to a railing component comprising: a first body portion having an outer surface and an interface surface with a mounting groove thereon; a second body portion having an outer surface and an interface surface with a mounting groove thereon, the interface surface of the second body portion having a mating portion adapted to receive a portion of the interface surface on the first body portion; and a hinge connecting the first body portion to the second body portion. When the interface surface on the second body portion is folded about the hinge and is brought into alignment with the interface surface on the first body portion, the interface portions on the first body portion and the second body portion can form a fastener-receiving opening by the cooperating alignment of the mounting grooves on the abutted interface surfaces of the first body portion and the second body portion.

Various other embodiments of the invention are also contemplated. For example, the outer surface of at least one of the first body portion or the second body portion can comprise at least one rib thereon. The hinge can comprise a living hinge integrally formed of the same material comprising and with the first body portion and the second body portion. The outer surface of at least one of the first body portion or the second body portion can comprise opposed inclined surfaces thereon. The opposed inclined surfaces can be separated by a vertical groove extending the length of the opposed inclined surfaces. A plurality of ribs can be disposed laterally of, and perpendicularly to, the vertical groove on the opposed inclined surfaces. The plurality of ribs can have rounded ends thereon.

The interface surface on the first body portion can have a longitudinal protrusion on one vertical side thereof and an oppositely-disposed longitudinal slot on an opposed vertical side thereof. The interface surface on the second body portion can have a longitudinal protrusion on one vertical side thereof and an oppositely-disposed longitudinal slot on an opposed vertical side thereof. The longitudinal protrusion and longitudinal slot on the interface surface of the first body portion can be disposed on opposite vertical sides that the longitudinal protrusion and longitudinal slot on the interface surface of the second body portion. When the interface surface on the second body portion is brought into alignment with the interface surface on the second body portion, the longitudinal protrusion on the interface surface of the first body portion can be disposed with the longitudinal slot on the interface surface of the second body portion and the longitudinal slot on the interface surface of the first body portion can receive the longitudinal protrusion on the interface surface of the second body portion. The mounting groove on the interface surface of the first body portion can be disposed between the longitudinal protrusion and the longitudinal slot thereof, and the mounting slot on the interface surface of the second body portion can be disposed between the longitudinal protrusion and the longitudinal slot thereof.

In another aspect of the invention, the invention relates to a railing system including at least one rail, a baluster having a recess on at least one end thereof, and a connector for interconnecting the baluster to the at least one rail, the connector comprising a first body portion having an outer surface and an interface surface with a mounting groove thereon, a second body portion having an outer surface and an interface surface with a mounting groove thereon, the interface surface of the second body portion having a mating portion adapted to receive a portion of the interface surface on the first body portion, and a hinge connecting the first body portion to the second body portion, wherein, when the interface surface on the second body portion is folded about the hinge and is brought into alignment with the interface surface on the first body portion, the interface portions on the first body portion and the second body portion form a fastener-receiving opening by the cooperating alignment of the mounting grooves on the abutted interface surfaces of the first body portion and the second body portion.

DESCRIPTION OF EMBODIMENTS OF THE INVENTION

Figure 1:
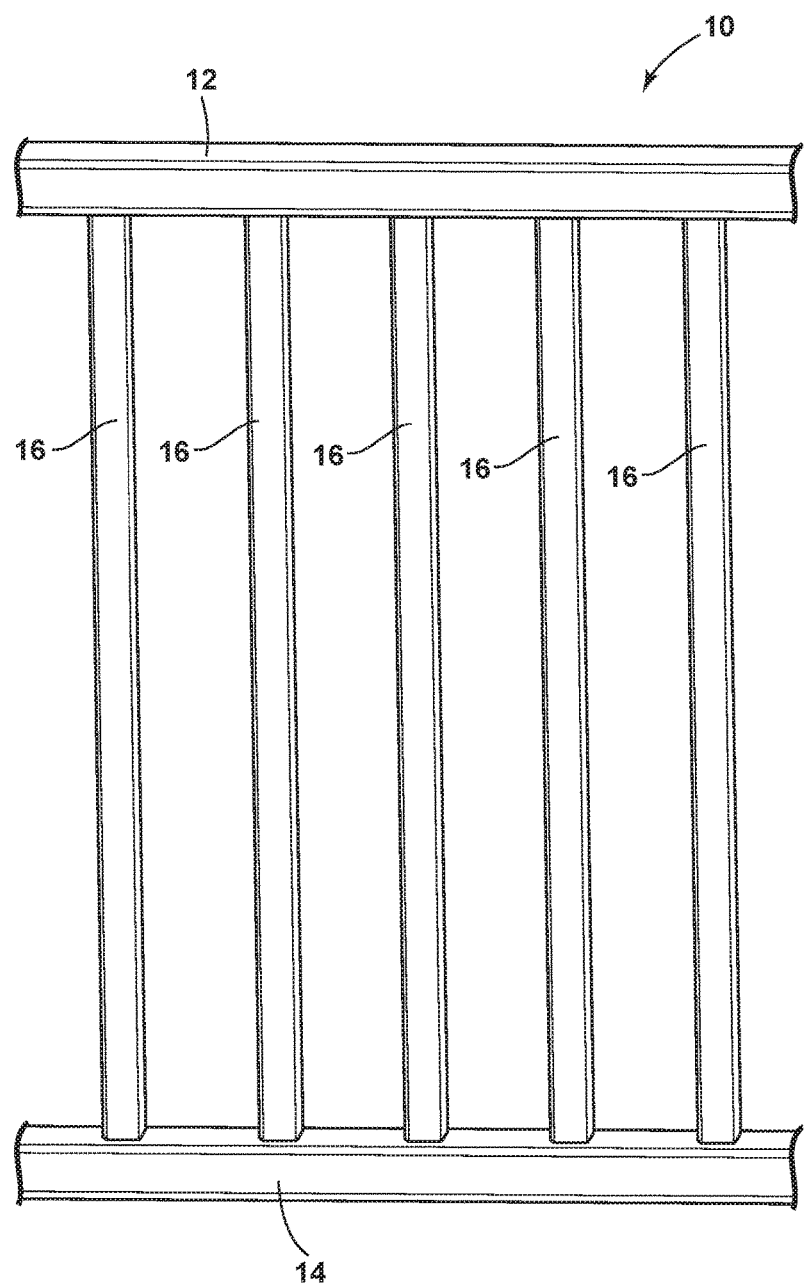
FIG. 1 is a side view of a horizontal railing with a top rail, a bottom rail, and a few balusters.
Figure 2:
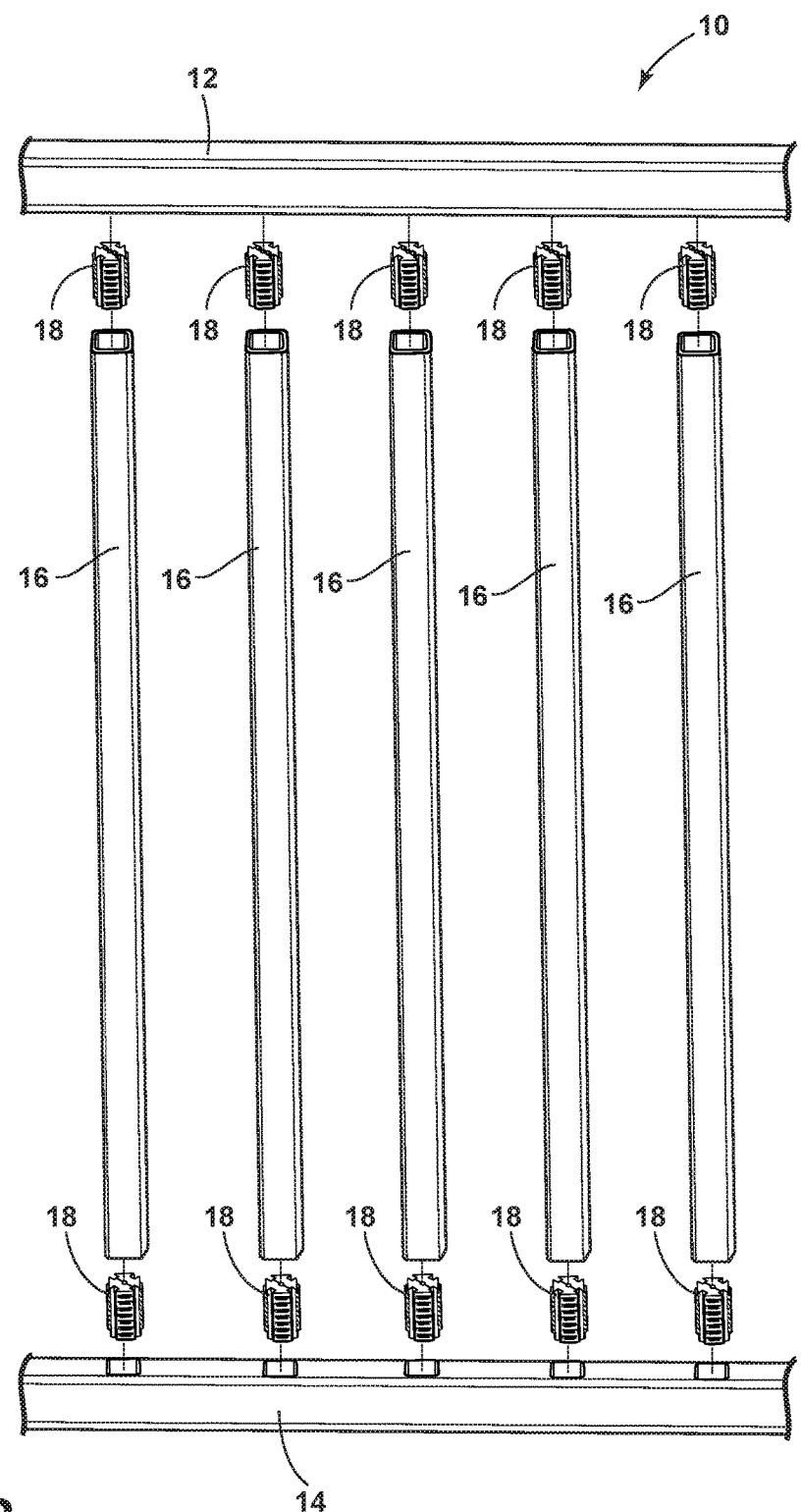
FIG. 2 is an exploded view of the railing of FIG. 1.
Figure 3:
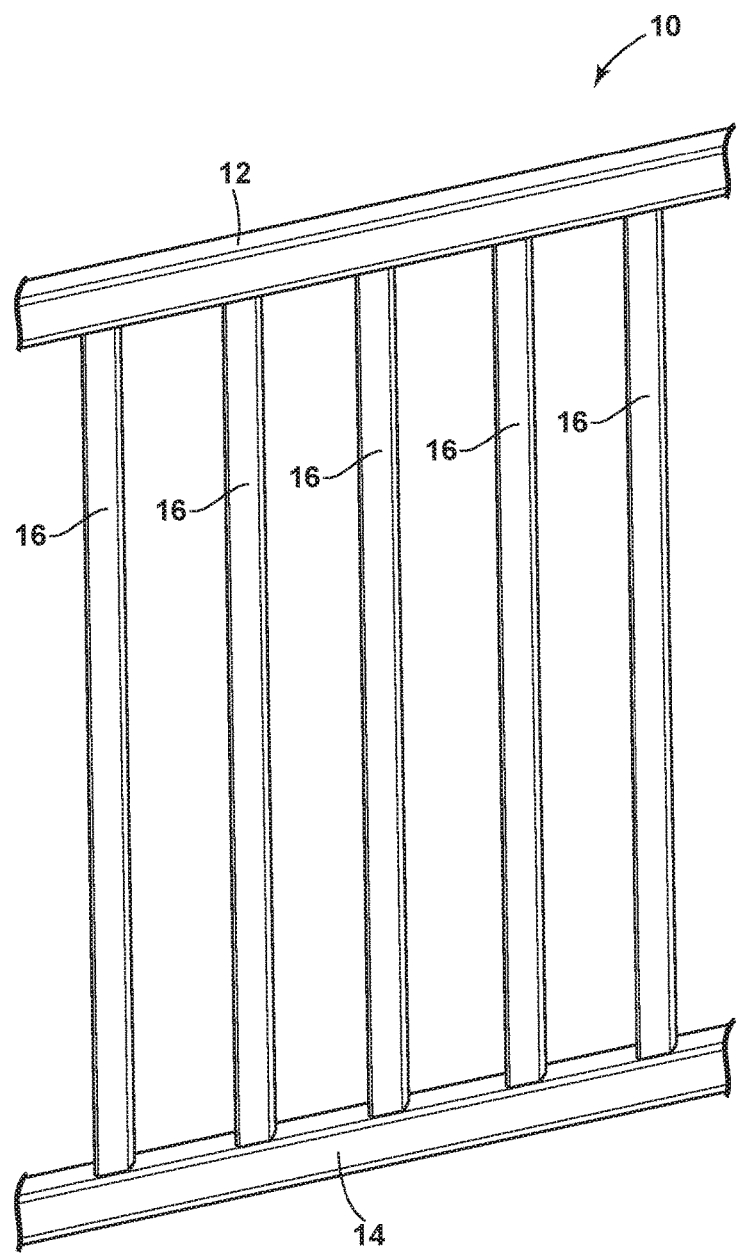
FIG. 3 is a side view of an angled rail on a staircase with a top rail, a bottom rail, and a plurality of balusters extending therebetween.
Figure 4:
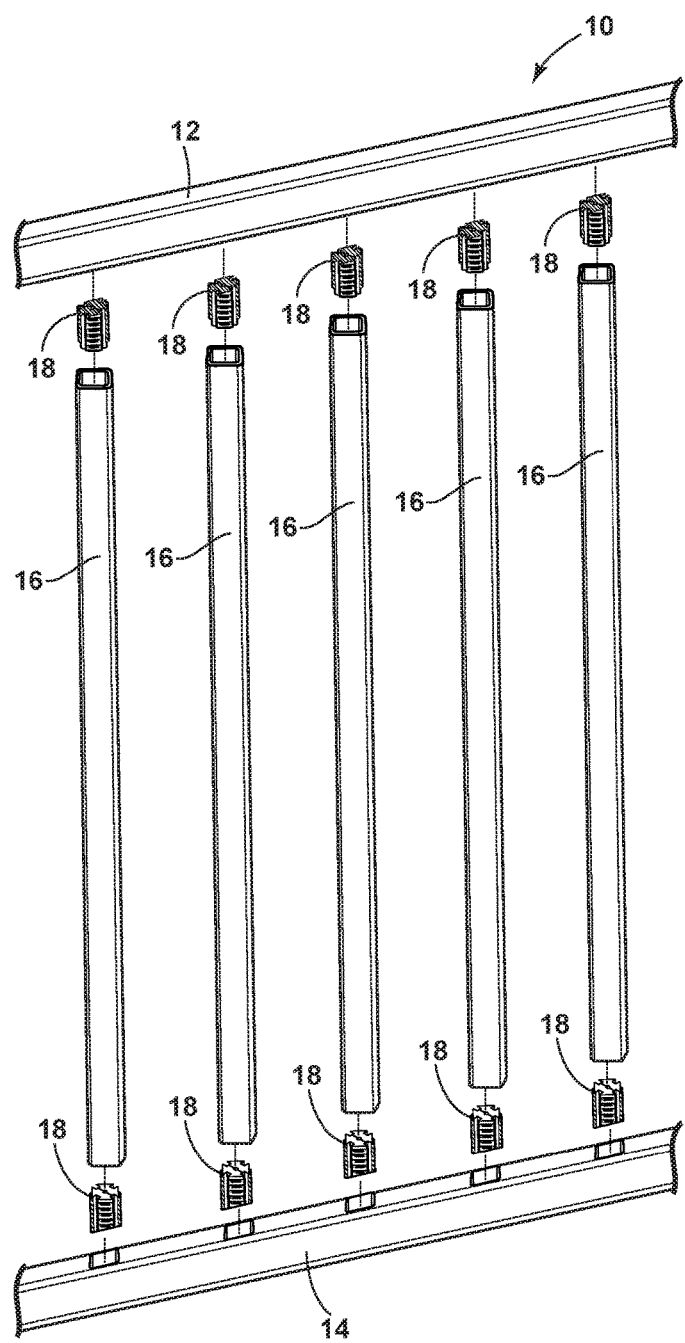
FIG. 4 is an exploded view of the railing of FIG. 3 showing baluster connectors located between each rail and the plurality of balusters.
Figure 5:
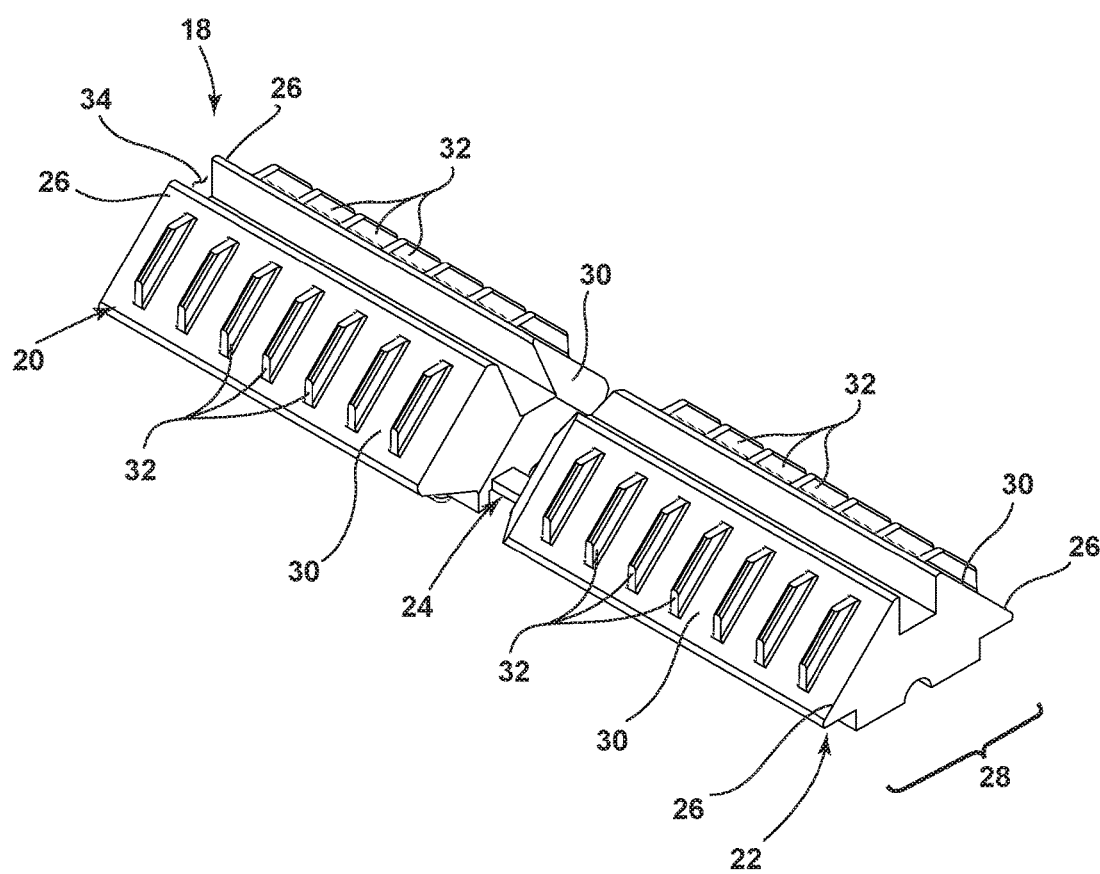
FIG. 5 is a perspective view of the baluster connector of FIG. 4 in an unfolded configuration.
Figure 6:
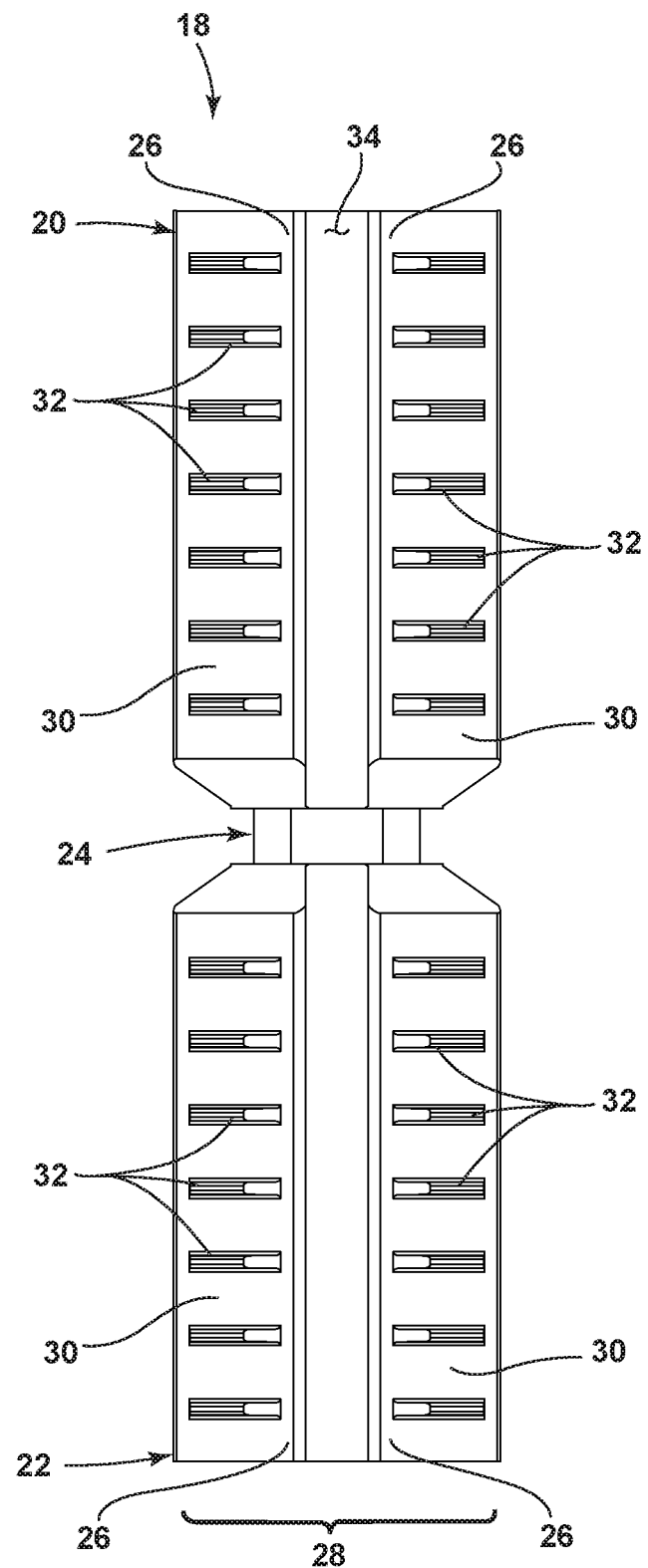
FIG. 6 is a front view of the baluster connector of FIG. 4 in an unfolded configuration.
Figure 7:
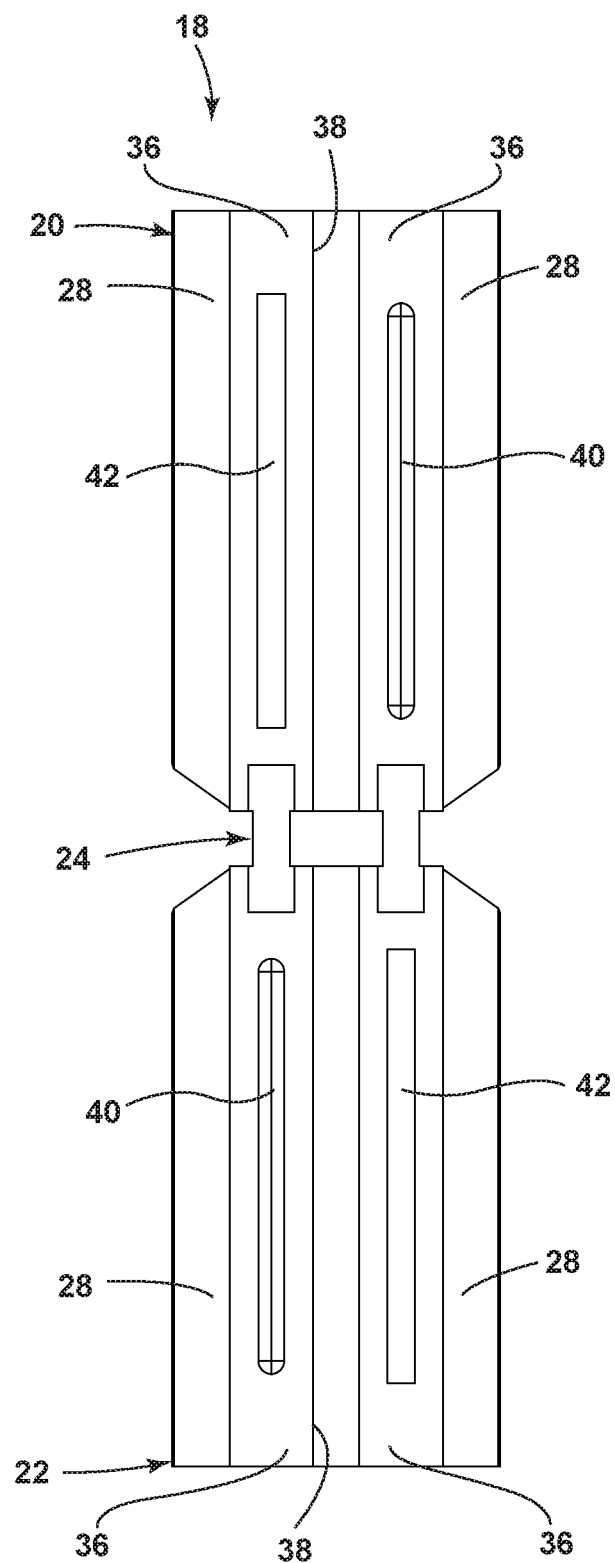
FIG. 7 is a rear view of the baluster connector of FIG. 4 in an unfolded configuration.

Turning now to the drawings, and to FIGS. 1-4 in particular, the invention relates generally to railing systems 10, shown by example in FIGS. 1-4, which typically have a top rail 12, a bottom rail 14, a plurality of balusters 16 spanning a vertical distance between the top rail 12 and bottom rail 14. In some cases, the railing system 10 can only have a top rail 12, and the balusters 16 are connected directly to a floor surface (not shown in the exemplary railing systems shown in FIGS. 1-4). In these figures, a plurality of connectors 18 are shown for interconnecting each baluster 16 to a corresponding top rail 12 or bottom rail 14 of the railing system 10.

The connector 18 is shown in greater detail in FIGS. 5-14. The connector 18 generally comprises a first body portion 20, a second body portion 22, and a hinge 24 therebetween. It will be understood by one skilled in the art that the embodiments of the connector 18 described herein are illustrative only, and the specific features of the connector 18 shown herein should not be construed as limiting the scope of the invention. In one illustrative embodiment, the first body portion 20 and the second body portion 22 are formed as mirror images of one another and connected to each other in a pivotal manner by a hinge 24. In the example embodiment shown in the figures, the hinge 24 is shown generally as a "living hinge," formed generally of the same material making up the first body portion 20 and the second body portion 22 and integrally formed therewith. In this manner, the first body portion 20 can be pivoted with respect to the second body portion 22 about the hinge 24.

Turning to the specifics of the first body portion 20 and the second body portion 22, it will be understood that elements common to each of the first body portion 20 and the second body portion 22 will be described with common reference numerals. Therefore, because the first body portion 20 can be formed as a mirror image of the second body portion 22, the only difference between the orientation of the elements of the first body portion 20 and the second body portion 22 will be in the juxtaposition of common elements in the mirror image configuration of the elements.

The first and second body portions 20, 22 generally comprise an outer surface 26 and an interface surface 28. The outer surface 26 of the first and second body portions 20, 22 generally comprise a pair of opposed inclined surfaces 30 having a series of ribs 32 formed thereon. In one example embodiment of the ribs 32, the ribs are formed in a generally lateral direction with respect to the elongation of the first and second body portions 20, 22. In another example embodiment, the ribs can be provided with tapered or angled ends, which give the ribs 32 a trapezoidal-like appearance when viewed from an end of the first and second body portions 20, 22.

In the example embodiment of the connector 18 shown in the figures, a longitudinal groove 34 can be provided along a generally longitudinal axis located in between the opposed, inclined surfaces 30 on the outer surface each 26 of the first and second body portions 20, 22. As shown by example in the figures, the longitudinal groove 34 can have a generally rectangular cross-section and can extend the full longitudinal length of the corresponding first body portion 20 or second body portion 22.

The interface surface 28 of the first and second body portions 20, 22 generally comprises a plane or surface having a pair of generally-flat rectangular protrusions 36 separated by a longitudinal groove 38. In one example of the interface surface 28, the longitudinal groove 38 on the interface surface 28 can extend the full longitudinal length of the interface surface 28 between the protrusions 36. In the example embodiment shown in the figures, the longitudinal groove 38 on the interface surface 28 comprises a half-circular cross-section.

The interface surface 28 of the first and second body portions 20, 22 are also provided with a longitudinal protrusion 40 on one of the protrusions 36 on the interface surface 28, and a juxtaposed mating slot 42 on the other of the protrusions 36 on the interface surface 28 of the first and second body portions 20, 22. It will be understood that the protrusion 40 and mating slot 42 are disposed on opposite sides of the longitudinal groove 38 on the interface surface 28. For example, in the orientation shown in FIG. 5, the longitudinal protrusion 40 is shown on the right side of the longitudinal groove 38 on the interface surface 28, and the mating slot 42 is shown on a left side of the longitudinal groove 38 on the interface surface 28 of the first body portion 20. As can be seen from the figures, the longitudinal protrusion 40 and mating slot 42 on the second body portion 20 are thereby shown on opposite sides of the longitudinal groove 38 on the interface surface 28 on the second body portion 22.

Figure 8:
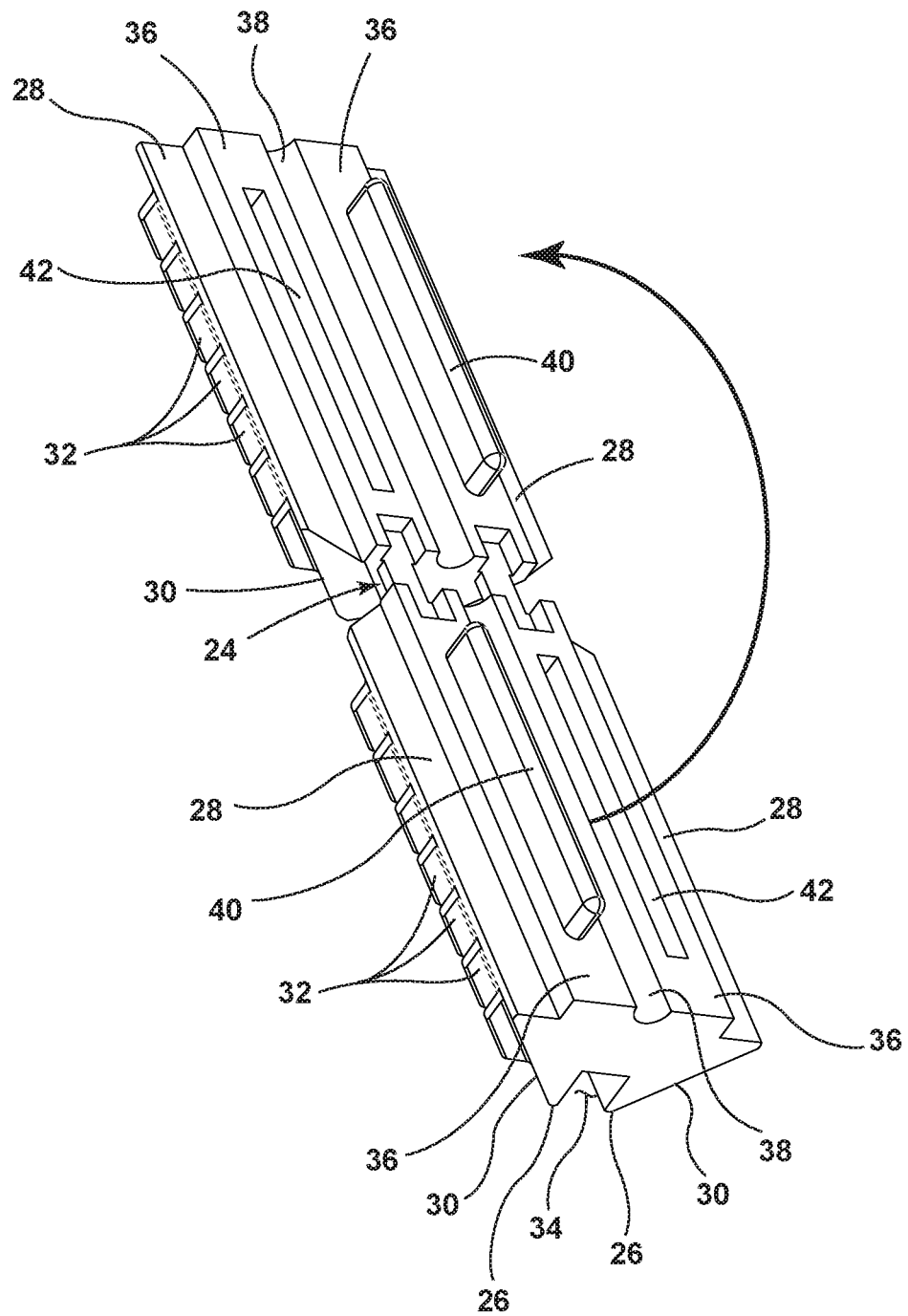
FIG. 8 is a perspective view of baluster connector in the unfolded configuration with an arrow a showing direction of folding toward a folded position.
Figure 9:
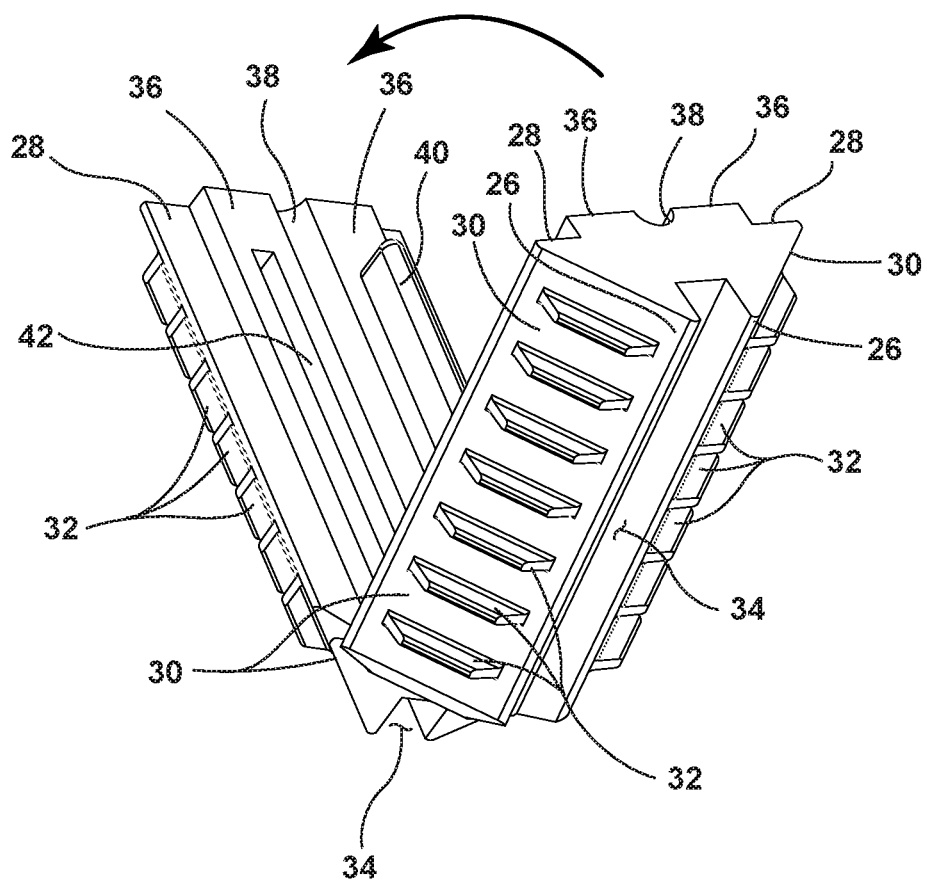
FIG. 9 is a perspective view of baluster connector being moved from the folded configuration to the unfolded configuration with an arrow showing a direction of folding toward the folded position.
Figure 10:
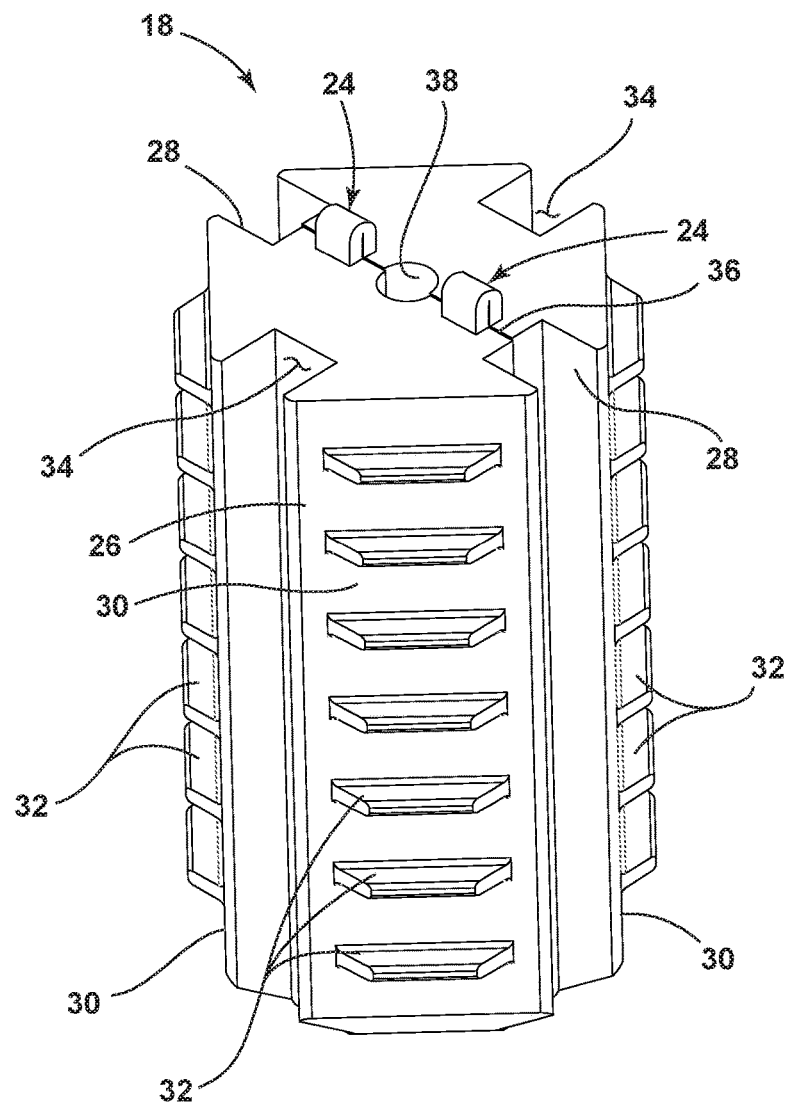
FIG. 10 is a perspective view of the baluster connector in a folded configuration.

Turning to FIGS. 8-10, the assembly of the connector 18 will now be described. In FIG. 8, the connector 18 is shown in an unfolded configuration wherein the hinge 24 separating the first body portion 20 and the second body portion 22 is in a generally longitudinal configuration with respect to the body portions 20, 22. Turning to FIG. 9, the second body portion 22 is pivoted with respect to the first body portion 20 about the hinge 24 as shown by the arrow in FIG. 9, to begin to bring the body portions 20, 22 into juxtaposed alignment so that the interface surfaces 28 on the body portions 20, 22 begin to become facing with one another. Finally, in FIG. 10, the interface surfaces 28 on the first and second body portions 20, 22 have been brought into juxtaposed relationship with one another so that the longitudinal protrusion 40 on the first body portion 20 is received within the longitudinal mating slot 42 on the second body portion 22. In addition, the longitudinal protrusion 40 on the second body portion 22 is also received within the longitudinal mating slot 42 on the first body portion 20. Preferably, the receipt of the longitudinal protrusions 40 into the corresponding mating slots 42 on the first and second body portions 20, 22 retain the first and second body portions 20, 22 in mating engagement with one another.

In the example embodiment shown in FIG. 10, the opposed inclined surfaces 30 on the outer surfaces 26 of the first and second body portions 20, 22 thereby form a generally rectangular periphery to the connector 18 and the longitudinal grooves 34 on the first and second body portions 20, 22 are now in an opposed relationship with one another. The longitudinal groove 38 on the juxtaposed interface surfaces 28 on the first and second body portions 20, 22 have now been brought into alignment with one another, so that the opposed complementary cross-sections of the juxtaposed longitudinal grooves 38 form a fastener-receiving opening which extends the longitudinal length of the connector 18.

Figure 11:
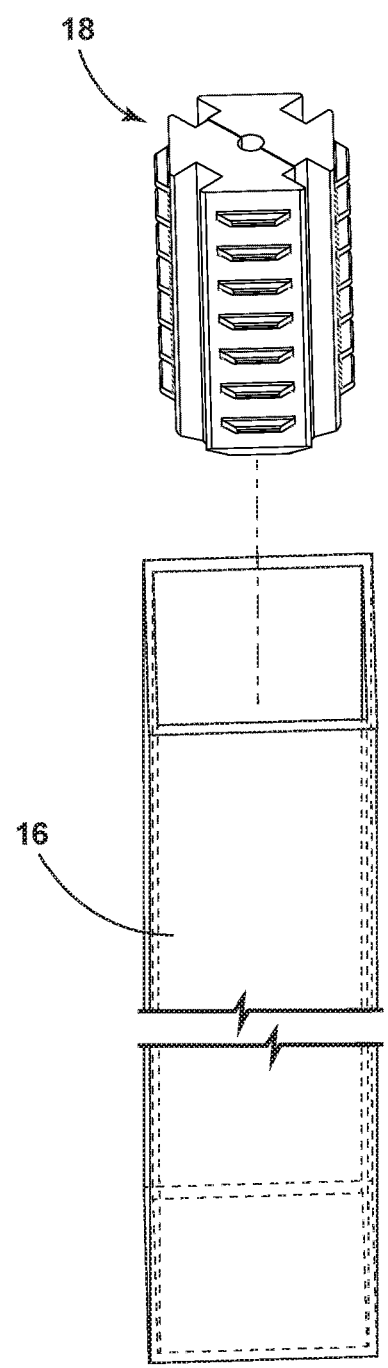
FIG. 11 is a perspective view showing baluster connector in the folded configuration next to a hollow baluster.
Figure 12:
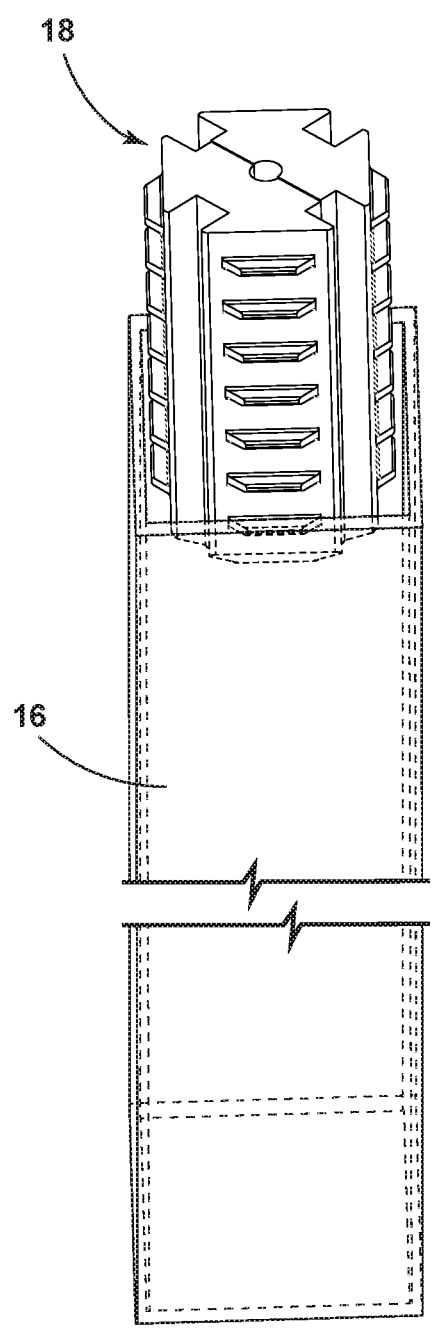
FIG. 12 is a perspective view showing baluster connector in the folded configuration being pushed into a hollow baluster.
Figure 13:
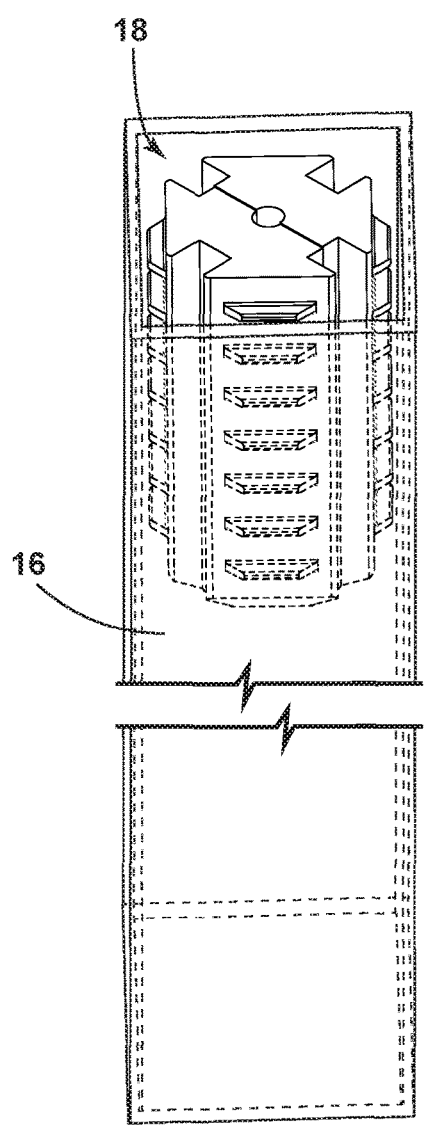
FIG. 13 is a perspective view showing baluster connector in the folded configuration fully inserted into hollow baluster.
Figure 14:
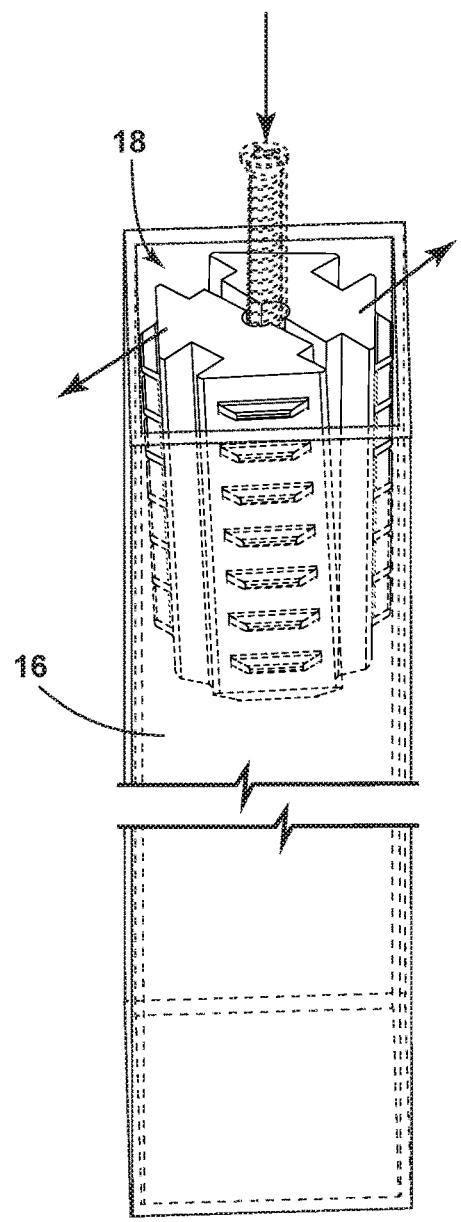
FIG. 14 is a perspective view showing baluster connector in the folded configuration inside a hollow baluster and showing a fastener in phantom outline pushing the opposed body portions of the baluster connector outwardly to wedge the baluster connector inside the hollow baluster.

In use, as shown in FIGS. 11-12, the connector 18 is moved from the unfolded to the folded configuration as described with respect to FIGS. 8-10, and then positioned adjacent an open hollow end of the baluster 16. The connector 18 is preferably press-fit into an open, hollow end of the baluster 16 and lodged adjacent to an end thereof. Conventional fasteners can thereby be used to connect the baluster 16 and connector 18 subassembly to a top rail 12 or a bottom rail 14 of a railing system 10 in a known manner.

The connector 18 is an improvement over existing connectors for balusters because it can expand within a hollow portion of a baluster while to attaching the balusters to a portion of a railing system. The connector 18 allows the consumer to build a railing system in which the connection between the baluster and the railing system can be limited to a connection located just at the end of the baluster and the connector 18 creates a secure connection between the baluster and the railing system.

It will be apparent to one skilled in the art that the connector can be made from any suitable material, including but not limited to, a variety of materials such as plastic, composite, metal, wood, fiberglass, or some combination of these materials. In one example embodiment, the connector 18 can be made of injection molded plastic.

As described above, the connector 18 can have two body portions that can be moved into a folded configuration adjacent each other. This split-body design allows for manufacturing the various features in a more efficient manner, without requiring complicated molding techniques or complicated moving mold parts. Further, the invention relates to a connector 18 that can expand as a conventional fastener, such as a screw, nail or the like, is driven through the opening in the first end of the body portion, displacing the two halves outwardly within the hollow baluster opening.

The mating faces of the connector 18 can each contain a portion of the fastener opening that forms a screw boss. The fastener opening allows a conventional fastener to be inserted. The purpose of the abutting interface surfaces is to help hold the connector 18 in the folded configuration for insertion in the hollow baluster 16, as well as to maintain the body portions aligned inside the baluster. In the event, that the hinge interconnecting the body portions together were to break while moving the connector 18 into the folded configuration, the connector 18 would still function normally.

It will also be apparent to one skilled in the art that an outside dimension of the connector 18 can be selected as needed for an internal dimension of a corresponding baluster 16 and that the outer circumferential configuration of the connector 18 may be any geometric shape to accommodate the shape of the corresponding baluster 16. The plurality of ribs on the connector 18 can provide a friction fit when the connector 18 is inserted within a hollow end of a baluster 16. The outside dimension of the ribs can optionally be selected to be slightly larger than the inside dimension of the hollow end of the baluster 16 so that the ribs can flex slightly as the connector 18 is pushed into the hollow end of the baluster 16. The ribs can flex further as a fastener is driven through the center of the connector 18 to cause a friction fit of a desired withdrawal force between the baluster 16 and connector 18.

The railing system can be constructed by pushing connectors 18 into the hollow ends of the balusters 16. The balusters 16 can thereby be positioned between a top rail 12 and a bottom rail 14 of the railing system 10. Fasteners can be driven through the rails 12, 14 and into the mounting groove of the connector 18. The rails 12, 14 can be attached between posts as would be apparent to one skilled in the art in a known manner. If desired, a cap rail (not shown in the drawings) can be installed over the top rail 12 to conceal the fasteners connecting the balusters 16 to the top rail 12 via the connectors 18.

As a further benefit of this design, rather than designing a separate connector for stairs, the connector 18 can be simultaneously cut with the baluster to the same angle as the staircase (or as a ramp, as the case may be). The baluster can then be attached to the stair rails in the same manner as a line rail.

The invention can be used primarily in the construction of railings adjacent a walking surface such as decks, porches, ramps, and patios. It may also be used while constructing fencing.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A baluster connector, comprising:
    a first body portion having an outer surface and an interface surface with a mounting groove thereon;
    a second body portion having an outer surface and an interface surface with a mounting groove thereon, the interface surface of the second body portion having a mating portion adapted to receive a portion of the interface surface on the first body portion; and
    a hinge connecting the first body portion to the second body portion;
    wherein, when the interface surface on the second body portion is folded about the hinge and is brought into alignment with the interface surface on the first body portion, the interface portions on the first body portion and the second body portion form a fastener-receiving opening by the cooperating alignment of the mounting grooves on the abutted interface surfaces of the first body portion and the second body portion; and
    wherein, when the interface surface on the second body portion is folded about the hinge and is brought into alignment with the interface surface on the first body portion, the connector is dimensioned to define an outermost periphery that is generally square or generally rectangular and where the outermost periphery is configured to be press-fit fully into a square or rectangular recess of a baluster to interconnect the baluster with a railing component.

2. The connector of claim 1 wherein the outer surface of at least one of the first body portion or the second body portion comprises at least one rib thereon.

3. The connector of claim 1 wherein the hinge comprises a living hinge integrally formed of the same material comprising and with the first body portion and the second body portion.

4. The connector of claim 1 wherein the outer surface of the first body portion comprises a first surface and a second surface disposed at an incline to the first surface and where the outer surface of the second body portion comprises a third surface and a fourth surface disposed at an incline to the third surface such that the connector comprises a generally rectangular periphery when the interface surface on the second body portion is folded about the hinge and is brought into alignment with the interface surface on the first body portion.

5. The connector of claim 4 wherein the first and second surfaces are separated by a vertical groove extending the length of the first and second surfaces.

6. The connector of claim 5 and further comprising a plurality of ribs disposed laterally of, and perpendicularly to, the vertical groove on the first and second surfaces.

7. The connector of claim 6 wherein the plurality of ribs have rounded ends thereon.

8. The connector of claim 1 wherein the mating portion of the interface surface of the second body portion comprises a longitudinal slot and the portion of the interface surface on the first body portion comprises a longitudinal protrusion.

9. The connector of claim 8 wherein the interface surface on the first body portion further has a longitudinal slot therein, and the interface surface on the second body portion further has a longitudinal protrusion, and wherein the longitudinal protrusion and longitudinal slot on the interface surface of the first body portion are disposed on opposite vertical sides that the longitudinal protrusion and longitudinal slot on the interface surface of the second body portion are disposed on so that, when the interface surface on the second body portion is brought into alignment with the interface surface on the second body portion, the longitudinal protrusion on the interface surface of the first body portion is disposed with the longitudinal slot on the interface surface of the second body portion and the longitudinal slot on the interface surface of the first body portion receives the longitudinal protrusion on the interface surface of the second body portion.

10. The connector of claim 9 wherein the mounting groove on the interface surface of the first body portion is disposed between the longitudinal protrusion and the longitudinal slot thereof, and the mounting groove on the interface surface of the second body portion is disposed between the longitudinal protrusion and the longitudinal slot thereof.

11. The connector of claim 1 wherein when the connector is received within the baluster and when a fastener is received within the fastener-receiving opening the first body portion and the second body portion are configured to be pushed outwardly and pivot via the hinge.

12. A railing system comprising:
at least one rail;
a baluster having a recess on at least one end thereof wherein the recess is square or rectangular; and
a connector for interconnecting the baluster to the at least one rail, the connector having an outermost periphery that is generally square or generally rectangular and configured to be received fully within the recess of the baluster, the connector comprising:
a first body portion having an outer surface and an interface surface with a mounting groove thereon;
a second body portion having an outer surface and an interface surface with a mounting groove thereon, the interface surface of the second body portion having a mating portion adapted to receive a portion of the interface surface on the first body portion; and
a hinge connecting the first body portion to the second body portion;
wherein, when the interface surface on the second body portion is folded about the hinge and is brought into alignment with the interface surface on the first body portion, the interface portions on the first body portion and the second body portion form a fastener-receiving opening by the cooperating alignment of the mounting grooves on the abutted interface surfaces of the first body portion and the second body portion wherein the fastener-receiving opening extends a full longitudinal length of the body portions.

13. The railing system of claim 12 wherein the outer surface of at least one of the first body portion or the second body portion comprises at least one rib thereon.

14. The railing system of claim 12 wherein the hinge comprises a living hinge integrally formed of the same material comprising and with the first body portion and the second body portion.

15. The railing system of claim 12 wherein the outer surface of at least one of the first body portion or the second body portion comprises a first surface and a second surface disposed at an incline to the first surface.

16. The connector of claim 15 wherein the first and second surfaces are separated by a vertical groove extending the length of the first and second surfaces.

17. The connector of claim 16 wherein the connector further comprises a plurality of ribs disposed laterally of, and perpendicularly to, the vertical groove on the first and second surfaces.

18. The railing system of claim 12 wherein the mating portion of the interface surface of the second body portion comprises a longitudinal slot and the portion of the interface surface on the first body portion comprises a longitudinal protrusion.

19. The railing system of claim 12, wherein the at least one rail comprises a top rail and a bottom rail, and the baluster is configured to span between the top rail and bottom rail.

20. The railing system of claim 12, wherein the connector further comprises a plurality of ribs disposed on the outer surfaces of the first and second body portions, wherein an outside dimension of the plurality of ribs is larger than an inside dimension of the recess of the baluster.

21. A baluster connector, comprising:
a first body portion having an outer surface and an interface surface with a mounting groove thereon;
a second body portion having an outer surface and an interface surface with a mounting groove thereon, the interface surface of the second body portion having a mating portion adapted to receive a portion of the interface surface on the first body portion; and
a hinge connecting the first body portion to the second body portion;
wherein, when the interface surface on the second body portion is folded about the hinge and is brought into alignment with the interface surface on the first body portion, the interface portions on the first body portion and the second body portion form a fastener-receiving opening by the cooperating alignment of the mounting grooves on the abutted interface surfaces of the first body portion and the second body portion wherein the fastener-receiving opening extends a full longitudinal length of the body portions; and wherein, when the interface surface on the second body portion is folded about the hinge and is brought into alignment with the interface surface on the first body portion, the outer surface of the first body portion and the outer surface of the second body portion are dimensioned to define an outermost periphery of the connector that is generally square or generally rectangular and wherein the outermost periphery of the connector is configured to be press-fit fully into a recess of a baluster to interconnect the baluster with a railing component.

22. The connector of claim 21 wherein the hinge includes a first hinge section and a second hinge section, separate from the first hinge section and spaced along a width of the connector and where the fastener-receiving opening is located along the width between the first hinge section and the second hinge section.

* * * * *